United States Patent

[11] 3,579,107

| [72] | Inventors | Edward W. Buttenhoff<br>Excelsior;<br>Lyman L. Hill, Jr., St. Paul, Minn. |
|---|---|---|
| [21] | Appl. No. | 795,386 |
| [22] | Filed | Dec. 23, 1968 |
| [45] | Patented | May 18, 1971 |
| [73] | Assignee | Honeywell Inc.<br>Minneapolis, Minn.<br>Continuation-in-part of application Ser. No. 752,005, Aug. 12, 1968, now abandoned. |

[54] INDICATING CONDITION CONTROLLER HAVING A FACE INCLUDING A ROTATABLE SCALE PLATE COOPERATING WITH A WIDE ANGLE 250° METER
10 Claims, 7 Drawing Figs.

[52] U.S. Cl. ................................................. 324/157, 73/362
[51] Int. Cl. ................................................. G01n 17/00
[50] Field of Search ............................... 324/157, 115, 156, 123; 73/359, 362(R)

[56] References Cited
UNITED STATES PATENTS

| 1,593,626 | 7/1926 | Foote | 73/262(R) |
| 1,791,563 | 2/1931 | Horn | 73/359UX |
| 2,363,057 | 11/1944 | Gaylord | 324/123X |

Primary Examiner—Alfred E. Smith
Attorney—Lamont B. Koontz

ABSTRACT: An indicating temperature controller for use in controlling the temperature of an area and indicating the temperature of the area, the controller including a variable magnitude setpoint voltage source which is compared to a thermocouple voltage to originate an error voltage. A scaleplate carries a circular temperature scale. Manual rotation of the scaleplate rotates the temperature scale about an axis. A meter whose pointer is at rest (zero energization) at a position between extremities of movement is energized by the error voltage and has a pointer which rotates about the axis and is capable of swinging through an arc substantially equal to the arc length of the temperature scale. The setpoint voltage source includes a potentiometer. The scaleplate is coupled to rotate as the potentiometer wiper moves, so that the rest position of the pointer indicates the setpoint temperature and the pointer position indicates the thermocouple temperature. The potentiometer may be a potentiometer having a circular resistance element whose arc length is also substantially equal to the arc length of the temperature scale, or a multiturn potentiometer.

INVENTORS
EDWARD W. BUTTENHOFF
LYMAN L. HILL, JR.
BY
ATTORNEY.

Patented May 18, 1971
3,579,107
4 Sheets-Sheet 2
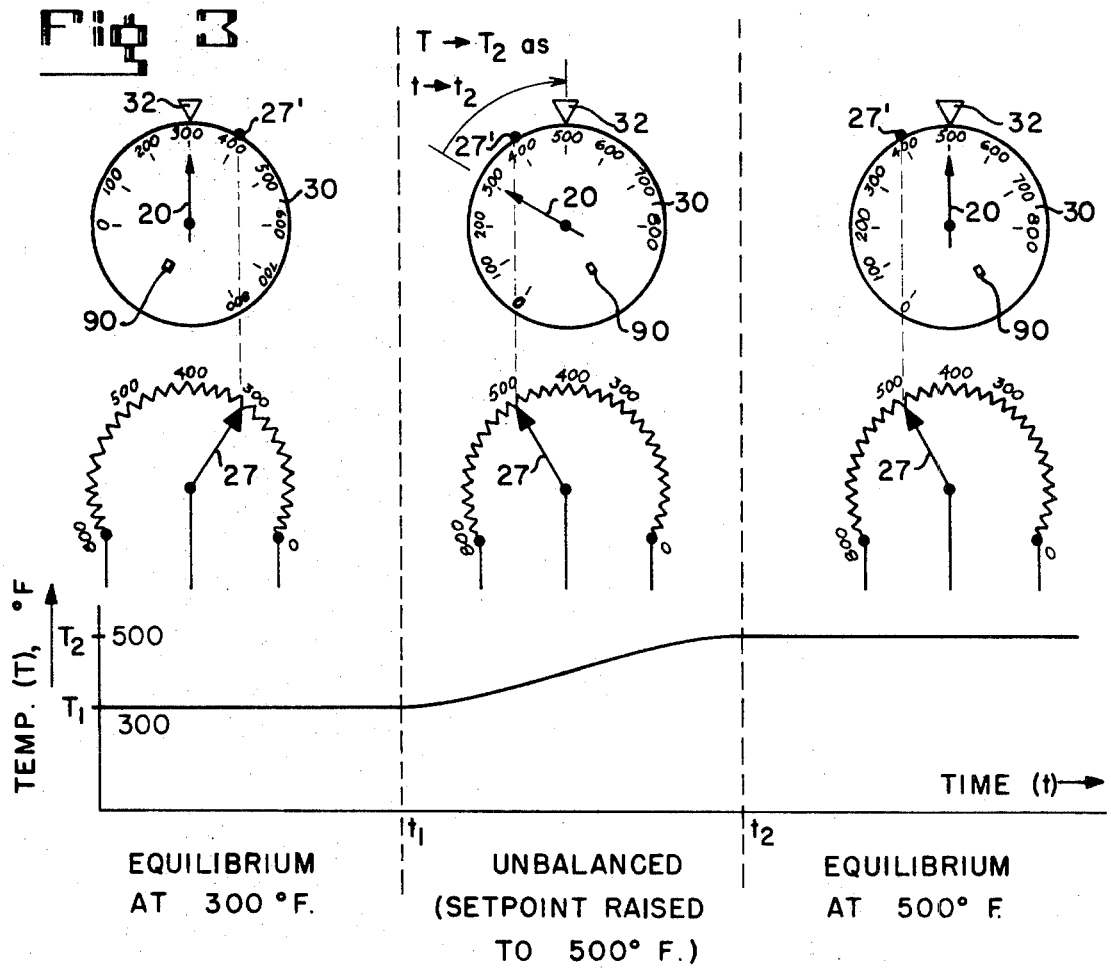
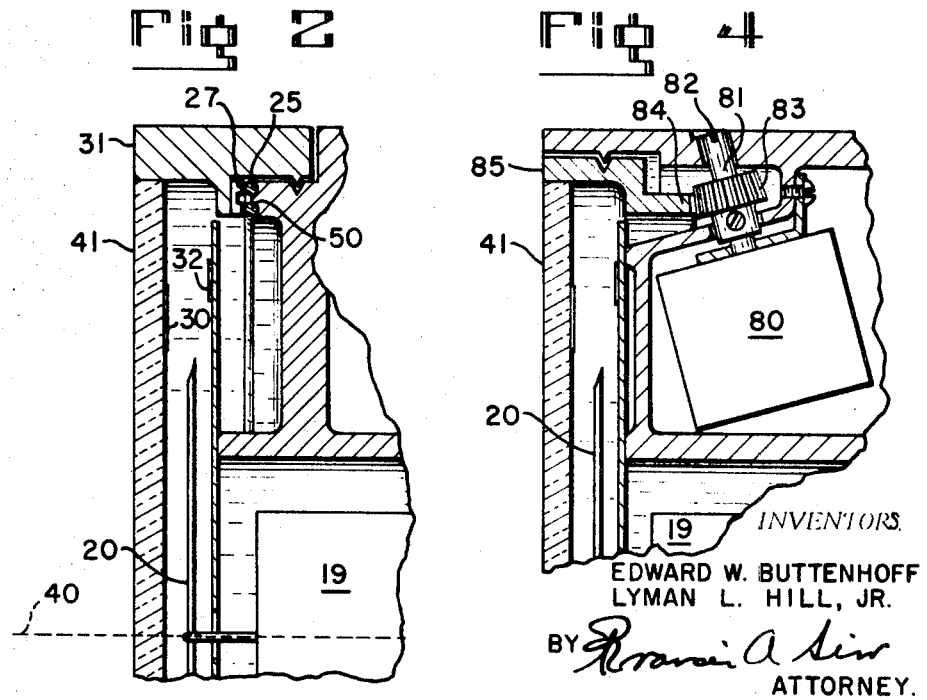
INVENTORS.
EDWARD W. BUTTENHOFF
LYMAN L. HILL, JR.
BY
ATTORNEY.

INVENTORS
EDWARD W. BUTTENHOFF
LYMAN L. HILL, JR.
BY

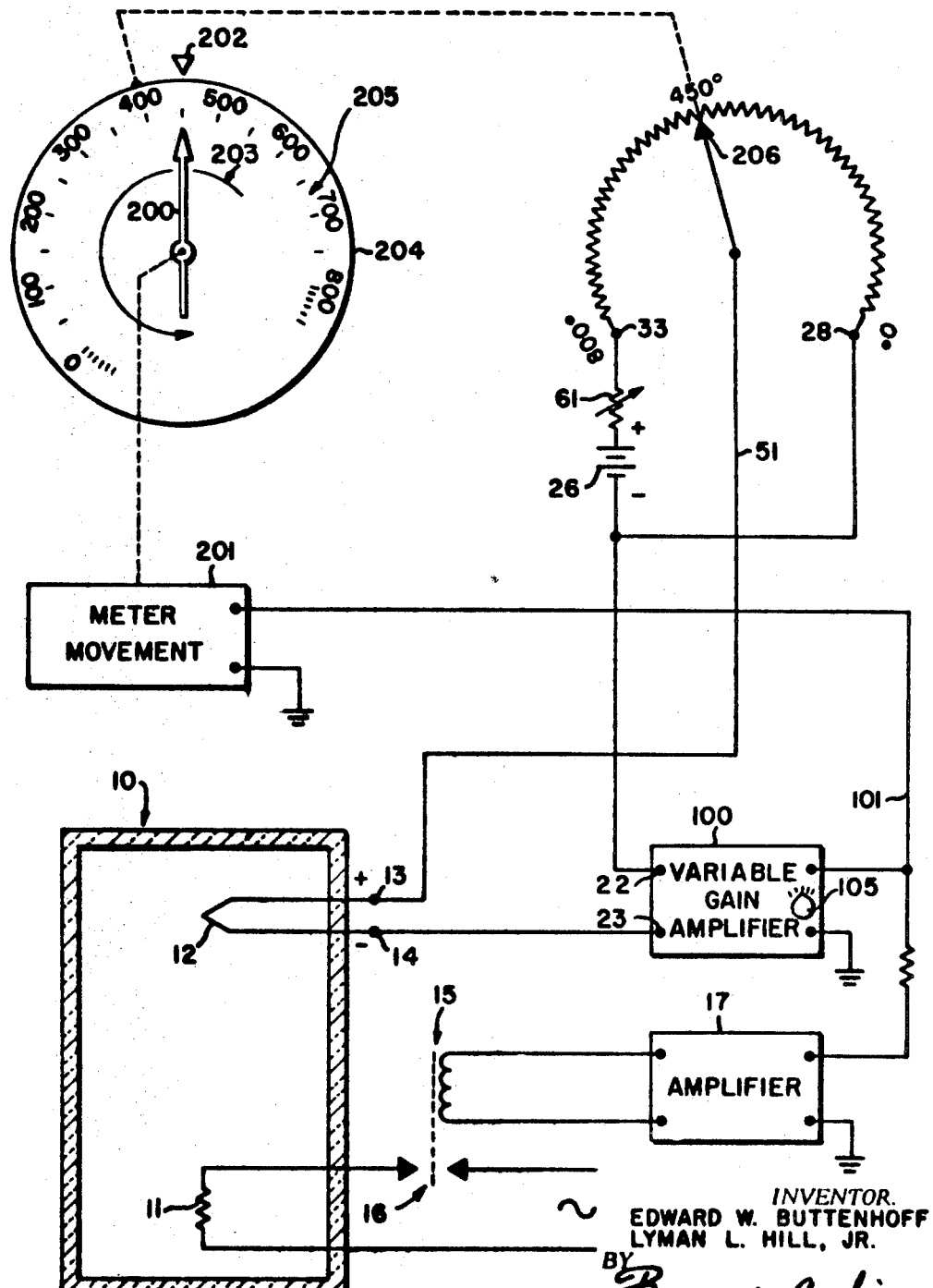

INDICATING CONDITION CONTROLLER HAVING A FACE INCLUDING A ROTATABLE SCALE PLATE COOPERATING WITH A WIDE ANGLE 250° METER

This application is a continuation-in-part of our copending application Ser. No. 752,005, filed Aug. 12, 1968, now abandoned for Indicating Condition Controller.

BACKGROUND OF THE INVENTION

Indicating temperature controllers are generally of two types, one having an indicating meter which moves from a zero voltage position, up scale, to indicate temperature, and the other having a deviation meter which moves either way from a rest position to indicate a small deviation in temperature from the setpoint.

The former type provides full scale indication. However, this indication is accurate only at certain meter calibration points. Thus accuracy is highest only when the setpoint temperature corresponds to a meter calibration point.

The latter type provides accurate indication at all setpoint temperatures, however, the range of temperature indication is limited to a small temperature deviation, in either direction, from the setpoint temperature.

SUMMARY OF THE INVENTION

A movable condition or temperature scaleplate which is coupled to the setpoint potentiometer. The entire scaleplate is visible and, in the preferred embodiment, an indicia of temperature occupies an arc of a circle. A meter, of the type whose pointer is at rest at a position between extremities of movement of the pointer, cooperates with the scaleplate and the total arc length of possible pointer movement to either side of the vertical rest position is substantially the same as the arc length of the indicia of temperature. Also, in the preferred embodiment, the setpoint potentiometer has a resistance element formed in a circle and the arc length of the element is substantially the same as the arc length of the indicia of the condition or temperature.

By means of this structure, the most accurate pointer position, the rest position, is always the setpoint condition or temperature.

When the setpoint condition or temperature is at a given position of the indicia, a full scale indication of the actual magnitude of the condition or temperature is possible. At other setpoints, the indication is limited by (1) the arc length of possible pointer movement, and (2) the portion of the movable indicia which cooperates with the pointer arc length. At this given position or setpoint, the arc length and the indicia arc length coincide and full scale cooperation and indication is possible.

BRIEF DESCRIPTION OF THE DRAWING

FIG. 2, shows the physical relationship of the scaleplate, meter and pointer, potentiometer and wiper, indicia of temperature, and indicia of the zero center pointer position, FIG. 3 is a graphical representation of a transition for control at 300° F. to 500° F. from time $t_1$ to $t_2$, FIG. 4 shows a modification of FIG. 2 wherein a multiturn potentiometer is substituted for the circular potentiometer of FIGS. 1 and 2, FIG. 7 is a further embodiment of the invention wherein the zero center meter of FIG. 1 is replaced by an offcenter zero meter.

DESCRIPTION OF THE PREFERRED EMBODIMENT

Figure 1:
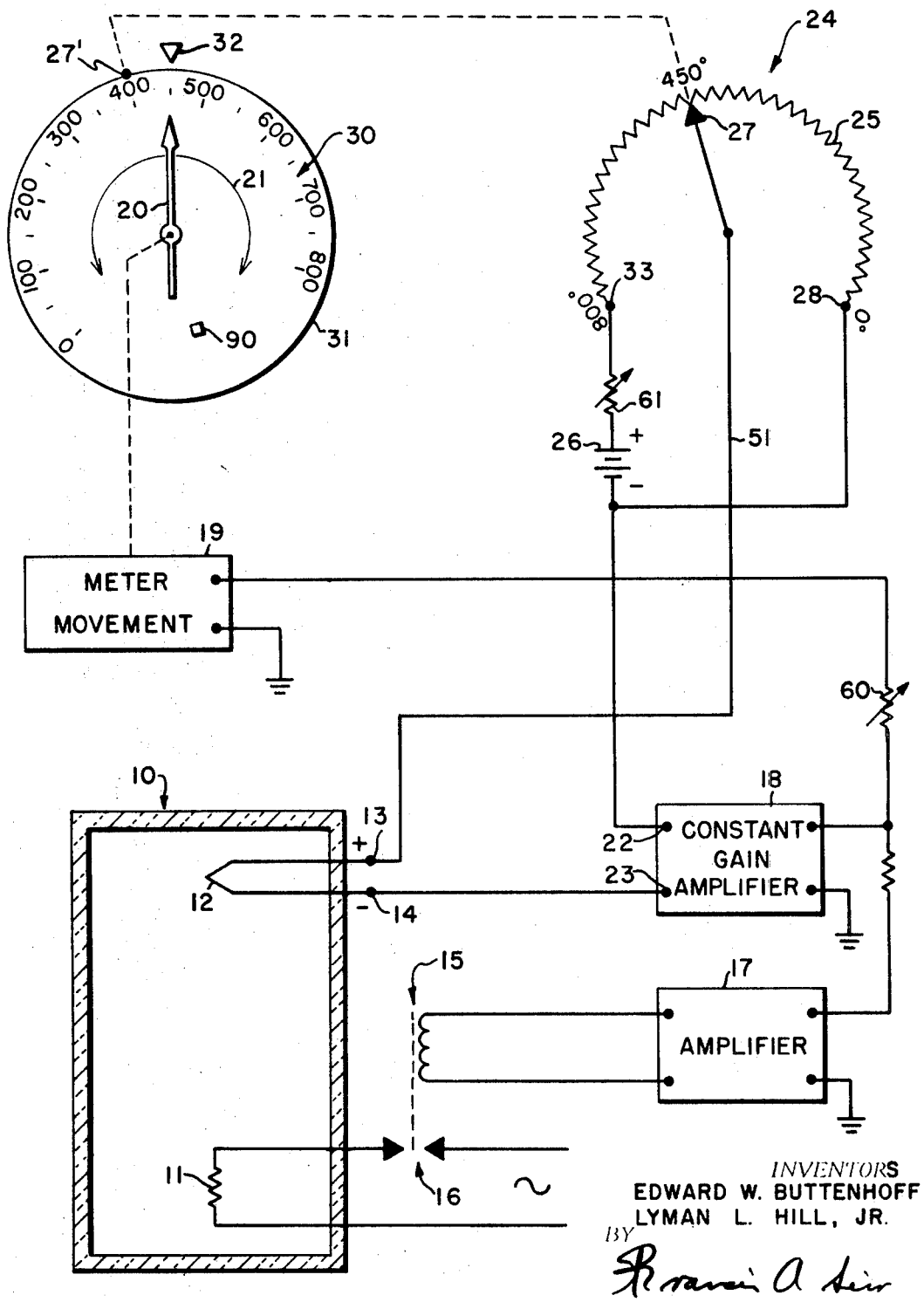
FIG. 1 is a representation of the preferred embodiment of the invention, showing the indicating temperature controller with a zero center meter, the controller being connected to control a heater associated with an oven.

Referring to FIG. 1, oven 10 contains a heater 11 and a thermocouple 12. Thermocouple output voltage at terminals 13 and 14 is of the polarity indicated and its magnitude increases as the temperature within the oven increases. Thus, thermocouple 12 is a condition sensitive voltage source whose voltage magnitude is indicative of oven condition. Thermocouple 12 is essentially a condition responsive millivolt source and other structures such as a condition responsive bridge could be used.

The indicating controller is connected to receive an input signal from thermocouple 12 and to control heater 11 to maintain a desired oven temperature. It is recognized that controllers utilizing the invention may be constructed to selectively supply either heating or cooling to the oven.

Relay 15 and its normally open switch 16 connect the heater in series with a source of voltage. The winding of relay 15 is connected to the output of amplifier 17, the input of this amplifier being connected to the output of constant gain amplifier 18. The output of amplifier 18 is also connected through variable resistor 60 to energize a meter including meter movement 19 and movable pointer 20.

The meter is, generically, a meter of the type which has a pointer which is at rest at a point between the extremities of movement of the pointer. Specifically the meter of FIG. 1 is a zero center meter having a vertical rest or zero center position as shown in FIG. 1. Pointer 20 is capable of moving equal distances either direction from this position, as represented by arrow 21. The extent of movement of the pointer is approximately 125° either side of the zero center position, or a total arc length of movement of 250°.

The input of amplifier 18, at terminals 22 and 23, consists of an error voltage originated by summing the thermocouple voltage at terminals 13 and 14 with the voltage existing across a portion of the resistance element of a potentiometer 24. Resistance element 25 of this potentiometer may be construed to e circular. The arc length of the resistance element is substantially the same as the arc length of possible movement of pointer 20, that is 250°. The resistance element is connected to a source of voltage 26 through a variable resistor 61.

The error voltage applied to the input terminals of amplifier 18 is found by tracing a circuit from terminal 23 through a voltage rise from terminal 14 to terminal 14 to terminal 13, conductor 51, wiper 27, a voltage drop from wiper 27 to end terminal 28 of the resistance element, to terminal 22. When the temperature within the oven is at the control point, as selected by the position of wiper 27, the voltage rise from terminal 14 to terminal 13 is equal to the voltage drop from wiper 27 to terminal 28 and the error voltage applied to the input of amplifier 18 is zero.

Pointer 20 and potentiometer wiper 27 cooperate with an indicia of temperature, or temperature scale, generally indicated by reference numeral 30. This temperature scale is calibrated from 0° to 800° and is carried by a rotatable member 31. Member 31 is coupled to move wiper 27 as member 31 moves. Wiper 27 may be mounted on member 31 as seen in FIG. 2. The position at which the wiper is mounted is identified by the reference numeral 27' (FIG. 1), this position coinciding with the 400° point on the temperature scale, that is the midrange of the temperature scale.

Reference numeral 32 identifies an indicia which indicates the zero center position of the pointer, this indicia being fixed in position relative to movable member 31 and temperature scale 30.

As shown in FIG. 1, the controller is set to maintain the temperature of the oven at 450°, this portion of the temperature scale coinciding with the zero center position of pointer 20 and indicia 32. The wiper is fixed to the 400° point on the temperature scale and is at the position shown in FIG. 1. While the potentiometer resistance element does not in fact bear an indicia of temperature, temperature scale 30 can be related to the resistance element by placing 0° indicia at terminal 28, 800° indicia at terminal 33, and 450° indicia at the present position of wiper 27. Since meter pointer 20 is at the zero center position, the error voltage at terminals 22 and 23 is zero and the temperature of oven 10 is 450°.

The physical relationship of the meter movement and its pointer, the potentiometer and its wiper, and the indicia of FIG. 1 can be more clearly seen in FIG. 2. In this FIG. it is seen that member 31 is a circular member which rotates about an axis identified generally by broken line 40. Meter movement 19 causes meter pointer 20 to rotate about this axis. The zero center position of this pointer is indicated by indicia 32 which is fixed in position. Member 31 includes a transparent scaleplate 41 which carries temperature scale 30. Potentiometer 24 is seen to include a wiper 27 in the form of a U-shaped shorting bar which cooperates with the circular resistance element 25 and with a circular conductor 50 of low resistance, conductor 50 being connected to conductor 51 of FIG. 1.

Transparent member 41 carries a stop 90 (see FIG. 1) for pointer 20. This stop extends in a downward direction, toward pointer 20. This stop functions to prevent movement of pointer 20 past the 0° indicia into the 800° portion of the scale when the setpoint is selected at a low temperature, and to prevent movement of pointer 20 past the 800° indicia into the 0° portion of the scale when the setpoint is selected at a high temperature.

The graphical representation of FIG. 3 represents three phases of operation of the controller. In the left-hand portion of FIG. 3, the controller is controlling in equilibrium at 300°. At time $t_1$, an adjustment is made calling for the temperature of the oven to be raised to 500°. During the time period $t_1$ to $t_2$, the heater is energized and the temperature of the oven increases to 500°. At the right-hand portion of FIG. 3, the controller is again controlling in equilibrium, now at 500°.

With the controller as shown at the left-hand portion of FIG. 3, potentiometer wiper 27 coincides with the 300° of FIG. 3, potentiometer wiper 27 coincides with the 300° point on the hypothetical resistance element temperature scale. Since 300° is the setpoint, 300° on temperature scale 30 coincides with indicia 32. Since the controller is in equilibrium, zero input voltage is applied to terminals 22 and 23 and pointer 20 is at its zero center position.

To raise the temperature of the oven to 500°, member 31 and temperature scale 30 are rotated in a counterclockwise direction to the position shown in the middle of FIG. 3. Since, at time $t_1$ the temperature of the oven remains at 300°, an error voltage is presented at terminals 22 and 23 and pointer 20 continues to indicate 300°, the pointer rotating in a counterclockwise direction as the temperature scale 30 rotates in a counterclockwise direction. Potentiometer wiper 27 moves from 300° to 500° on the potentiometer resistance element. Indicia 23 indicates the new 500° control point.

The error voltage now present at terminals 22 and 23 causes relay 15 to be energized and heat is supplied to the oven. The temperature of the oven gradually increases until at time $t_2$ the temperature is at the new setpoint temperature of 500°.

At this point the apparatus is as shown on the right hand portion of FIG. 3. Potentiometer wiper 27 remains at its 500° position, temperature scale 30 remains with 500° coincident to indicia 32 to indicate the control point temperature of 500°, and pointer 20 is at its zero center position, indicating that the temperature of the oven is indeed 500°.

FIG. 4 shows a modification of FIG. 2 wherein 10-turn potentiometer 80 is substituted for circular potentiometer 24. The wiper of potentiometer 80 is coupled to shaft 81 and this shaft may be turned by means of slot 82. Gear 83 is mounted on the shaft and cooperates with an annular gear 84 carried by a circular framing member 85 which carries transparent scaleplate 41. In this construction, potentiometer 80 functions identically to potentiometer 24.

Figure 5:
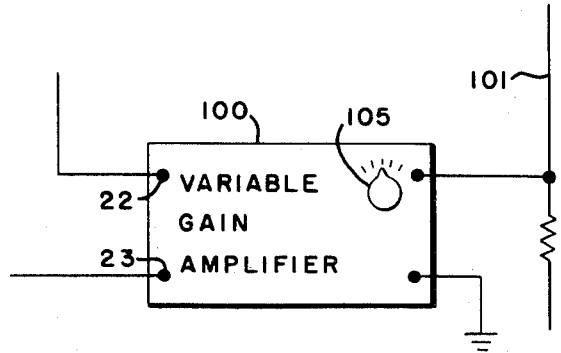
FIG. 5 shows a modification of FIG. 1 where a variable gain amplifier is substituted for the constant gain amplifier and potentiometer 60 of FIG. 1.

When the controller is to be used to indicate and to control a temperature range other than 0° to 800°, it is only necessary to change the scaleplate and to then adjust potentiometer 60 and 61. Potentiometer 61 is adjusted to produce the proper relationship between the voltage at wiper 27, which corresponds to the new temperature scale, and the output of the thermocouple. Potentiometer 60 is adjusted to produce the proper movement of pointer 20 for a given error voltage at terminals 22 and 23. An alternate structure to accommodate a change in temperature range is shown in FIG. 5 wherein variable gain amplifier 100 is substituted for constant gain amplifier 18 of FIG. 1, and wherein potentiometer 60 is replaced by conductor 101. In the structure of FIG. 5, gain adjustment potentiometer 105 is adjusted to produce the proper movement of pointer 20 for a given error voltage at terminals 22 and 23.

Figure 6:
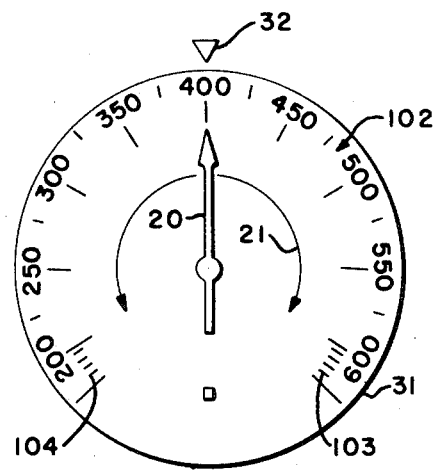
FIG. 6 shows a scaleplate-meter combination for a controller utilizing our invention wherein the controller-operating range is 200° F. to 400° F.

FIG. 6 discloses member 31 and pointer 20 with an indicia of temperature 102 covering the controller operating range which in this case is 200° to 600°. The arc length of the 200° to 600° indicia is substantially equal to the arc length of possible movement of pointer 20, as represented by arrow 21. Indicia of temperature 102 includes portion 103 and 104 which lies outside the 200° to 600° operating range of the controller. These portions do not cooperate with the possible pointer movement 21 when the control point is selected at midrange, 400°. However, when other control points are selected, such as 300° or 500°, portion 103 and 104 can be used to read thermocouple temperatures which are over 600° or under 200° respectively. Stop 90 again functions to prevent pointer 20 from alignment with the high temperature end of the scale when the thermocouple temperature is in fact significantly lower than 200°, and to prevent alignment with the low temperature end of scale 102 when the thermocouple temperature is in fact significantly higher than 600°.

FIG. 7 discloses an embodiment of the invention wherein the zero center meter of FIG. 1 is replaced by an offcenter zero meter. The two meters of FIGS. 1 and 7 fall within the generic definition of a meter whose pointer is at the rest or zero energization position at a point which is between the extremities of movement of the pointer.

Specifically the rest position of the pointer 200, controlled by meter movement 201, is vertical and coincides with the position of indicia 202. As indicated by arrow 203, pointer 200 may move either direction from its rest position. However, pointer 200 is capable of movement a greater distance counterclockwise from the rest position than clockwise from the rest position. For example, meter movement 201 may be a 250° movement with counterclockwise movement from the rest position being 185° and clockwise movement being 65°. This type of meter is defined as an offcenter zero meter species of the generic class of meters, above defined.

The cooperation between the various structural elements, such as movable member 204, temperature scale 205, and wiper 206, is the same as above described in connection with FIG. 1.

As above mentioned, the embodiment of the invention as disclosed in FIG. 1 provides full scale indication when the setpoint of 400° (the midposition of scale 30) is selected. At this position the actual condition within oven 10, anywhere between 0° and 800°, can be readout by pointer 20 as it cooperates with scale 30. Usually, it is more important that the actual condition below setpoint be indicated. In other words, it is more important that the controller be capable of indicating the actual condition when the operator raises the setpoint, as by counterclockwise rotation of member 31, than it is that the controller be capable of indicating the actual condition when the operator lowers the setpoint, as by clockwise rotation of member 31. In FIG. 1, pointer 20 is capable of covering the complete portion of scale 30 which exists below setpoint only for setpoints which are no higher than 400°. If a setpoint higher than 400° is selected, the lowest temperature which can be indicated by pointer 20 's that which coincides with the limit of counterclockwise rotation of the pointer.

The embodiment of the invention as disclosed in FIG. 7 allows pointer 200 to indicate the actual condition below setpoint, this being the range of scale from 0° to setpoint, for a greater range of setpoint adjustments. When a setpoint of approximately 600° is selected, full scale indications, from 0° to 800° is possible. Also, pointer 200 is capable of covering the complete portion of scale 205 which exists below setpoint for all setpoints which are no higher than 600°, as compared with 400° for the structure of FIG. 1.

FIG. 7 utilizes the variable gain amplifier and gain adjustment potentiometer of FIG. 5.

We claim:

1. An indicating condition controller adapted for use with a condition-sensitive voltage source and adapted to control a condition-changing means to thereby control the condition to which the condition-sensitive voltage source is subjected; the controller having a variable setpoint voltage indicative of a setpoint condition, means adapted to compare the condition-sensitive voltage to the setpoint voltage to originate an error voltage and to provide full scale indications of actual conditions, and adapted to control the condition-changing means in a manner to reduce the error voltage to zero; the improvement in the controller comprising:

a flat face meter having a wide angle meter movement connected to be energized in accordance with the error voltage and having a movable pointer which moves either direction from a rest position, said meter movement causing said pointer to rotate about an axis, a movable scaleplate, said scaleplate comprising a transparent member which overlies said pointer and carries a circular indicia of the condition which can be rotated about said axis, the arc length of said indicia being substantially equal to the arc length of possible movement of said pointer, the rest position of said pointer corresponding to the setpoint condition, a housing, said housing including a circular movable member holding said scaleplate and adapted to be rotated to adjust the setpoint condition by rotating said indicia about said axis relative to the rest position of said pointer, said movable scaleplate forming an outer surface of said housing so that the entire scaleplate is at all times visible, a source of voltage, a setpoint potentiometer having a wiper and a resistance element, one of which is fixed in position and the other of which is coupled to said scaleplate to move as said scaleplate moves, and wherein the setpoint condition is indicated by that portion of the indicia which coincides with the rest position of said pointer, and the condition to which the condition-sensitive voltage source is subjected is indicated by that portion of the indicia which coincides with the pointer, and circuit means connecting said resistance element to said source of voltage and connecting said wiper for comparison to the condition-sensitive voltage.

2. An indicating condition controller as defined in claim 1 having a constant gain amplifier whose input is connected to receive the error voltage and whose output is connected to energize said meter movement, said last named connection including variable impedance means to control the extent of movement of said pointer which is achieved by a given amplifier output.

3. An indicating condition controller as defined in claim 1 wherein said potentiometer wiper is coupled to said scaleplate, and wherein said potentiometer resistance element is circular and of an arc length substantially equal to the arc length of said indicia.

4. An indicating condition controller as defined in claim 1 wherein said potentiometer wiper is coupled to said circular movable member at a position generally coinciding with the midrange of said indicia, and wherein said potentiometer resistance element is circular and of an arc length substantially equal to the arc length of said indicia.

5. An indicating condition controller as defined in claim 4 including further indicia to indicate the rest position of said pointer.

6. An indicating condition controller as defined in claim 5 having a constant gain amplifier whose input is connected to receive the error voltage and whose output is connected to energize said meter movement, said last named connection including manually variable impedance means to control the extent of movement of said pointer in response to a given amplifier output.

7. An indicating condition controller as defined in claim 1 wherein said potentiometer wiper is gear coupled to said scaleplate, and wherein said potentiometer resistance element is a multiturn element, the gear coupling being such that the scaleplate is rotated through the arc length of said indicia of the condition, the wiper travels substantially the complete length of the resistance element.

8. An indicating condition controller as defined in claim 1 wherein said meter is a zero center meter.

9. An indicating condition controller as defined in claim 1 wherein said meter is an offcenter zero meter.

10. An indicating condition controller as defined in claim 9 wherein the pointer of said meter is capable of movement a greater distance below setpoint than above setpoint.